(12) United States Patent
Schmid et al.

(10) Patent No.: US 9,007,730 B2
(45) Date of Patent: Apr. 14, 2015

(54) SURGE PROTECTION CIRCUIT

(75) Inventors: Markus Schmid, Jettingen-Scheppach (DE); Johann Baptist Daniel Kuebrich, Schlüsselfeld (DE); Thomas Antonius Duerbaum, Baiersdorf (DE); Gian Hoogzaad, Mook (NL); Peter Laro, Wijchen (NL); Frans Pansier, Nuenen (NL)

(73) Assignee: NXP B.V., Eindhoven (NL)

( * ) Notice: Subject to any disclaimer, the term of this patent is extended or adjusted under 35 U.S.C. 154(b) by 975 days.

(21) Appl. No.: 12/980,554

(22) Filed: Dec. 29, 2010

(65) Prior Publication Data

US 2011/0164339 A1    Jul. 7, 2011

(30) Foreign Application Priority Data

Dec. 30, 2009   (EP) .................................... 09252933

(51) Int. Cl.
    *H02H 7/00*      (2006.01)
    *H02M 1/42*      (2007.01)

(52) U.S. Cl.
    CPC ............ *H02M 1/4208* (2013.01); *Y02B 70/126* (2013.01)

(58) Field of Classification Search
    USPC .......................................................... 361/18
    See application file for complete search history.

(56) References Cited

U.S. PATENT DOCUMENTS

| | | | |
|---|---|---|---|
| 3,997,889 A * | 12/1976 | Sato et al. ...................... | 340/652 |
| 4,949,234 A | 8/1990 | Gulczynski | |
| 5,784,236 A * | 7/1998 | Tardiff et al. ................... | 361/56 |
| 5,943,225 A * | 8/1999 | Park .................................. | 363/53 |
| 6,577,485 B2 * | 6/2003 | Reid et al. ..................... | 361/93.1 |
| 2005/0099829 A1 | 5/2005 | Wei et al. | |

FOREIGN PATENT DOCUMENTS

| | | |
|---|---|---|
| GB | 1 254 711 | 11/1971 |
| JP | 62-247764 A | 10/1987 |
| JP | 2002-034254 A | 1/2002 |
| JP | 2002034254 A * | 1/2002 |
| JP | 2004-260937 A | 9/2004 |

OTHER PUBLICATIONS

Extended European Search Report for European Patent Appln. No. 09252933.8 (Jun. 10, 2010).

* cited by examiner

*Primary Examiner* — Rexford Barnie
*Assistant Examiner* — Joseph Inge

(57) ABSTRACT

A surge protection circuit for a circuit having a rectification module. The surge protection circuit includes a first diode, a second diode, a capacitor and a discharge device. The anode of the first diode is connected to a first input of the rectification module, and the anode of the second diode is connected to a second input of the rectification module. The cathodes of the first and second diodes are both connected to the first plate of the capacitor. The second plate of the capacitor is connected to the negative output of the rectification module. The capacitor is configured such that it is consistently charged to substantially the peak value of a supply voltage during normal operation between surge events. The discharge device is connected to the first plate of the capacitor and is configured to discharge the capacitor when the voltage across the capacitor is in excess of the peak of the maximum value of the normal supply voltage and not discharge the capacitor when the voltage across the capacitor is not in excess of the peak of the maximum value of the normal supply voltage.

9 Claims, 7 Drawing Sheets

US 9,007,730 B2

SURGE PROTECTION CIRCUIT

This application claims the priority under 35 U.S.C. §119 of European patent application no. 09252933.8, filed on Dec. 30, 2009, the contents of which are incorporated by reference herein.

FIELD OF THE INVENTION

The present disclosure relates to the field of surge protection circuits, in particular, but not exclusively to surge protection circuits for circuits comprising a rectification module.

BACKGROUND OF THE INVENTION

There is a need to protect circuits, particularly circuits having a bridge rectifier module and a power factor correction (PFC) module from surge events/impulses in a power supply. Such surge events may be caused by lightning strikes or increases in a mains supply, for example.

Known ways of protecting against surge events include using at least two elements: a varistor between mains connectors and the bridge rectifier; and a bulk capacitor either directly behind the bridge rectifier or in parallel across the outputs of a PFC module. Further details of such surge protection is provided below in relation to FIG. 2.

One or more embodiments of the invention described herein can provide an improved surge protection circuit over the prior art, particularly for prior art circuits where there is no current path between the input voltage and a bulk capacitor. The improvement can lie in the use of fewer, and possibly the need for lower quality/specification, components than the prior art in order to provide adequate surge protection.

The listing or discussion of a prior-published document or any background in this specification should not necessarily be taken as an acknowledgement that the document or background is part of the state of the art or is common general knowledge.

According to a first aspect of the invention, there is provided a surge protection circuit for a circuit comprising a rectification module, the surge protection circuit comprising:
  a first diode;
  a second diode;
  a capacitor; and
  a discharge device; wherein
a first terminal of the first diode is connectable to a first input of the rectification module, a first terminal of the second diode is connectable to a second input of the rectification module, second terminals of the first and second diodes are both connected to the first plate of the capacitor, and the second plate of the capacitor is connectable to one of the outputs of the rectification module; and wherein:
  the capacitor is configured such that it is consistently charged to substantially a peak value of a supply voltage during normal operation; and
  the discharge device is connected to the capacitor and is configured to discharge the capacitor when the voltage across the capacitor is in excess of the peak value of the maximum supply voltage and not substantially discharge the capacitor when the voltage across the capacitor is not in excess of the peak value of the supply voltage during normal operation.

In some examples, the first and second diodes could be provided as part of a further bridge rectifier provided in parallel with the rectification module or as separate discrete components. It will be appreciated that the provision of the first and second diodes does not preclude the option of further diodes also being provided, for example the provision of a third and fourth diode as part of a further bridge rectifier.

The first terminals of the diodes may be the anode of the diodes, and the second terminals of the diodes may be the cathodes, or vice versa. The orientation of the diodes can be selected so as to provide a closed circuit for charging the capacitor from the mains supply, whereby the closed circuit includes a diode of the rectification module connected to one of the plates of the capacitor, and the first and second diodes are connected to the other plate of the capacitor.

There may be provided a surge protection circuit for a circuit comprising a rectification module, the surge protection circuit comprising:
  a first diode;
  a second diode;
  a capacitor; and
  a discharge device; wherein
the anode of the first diode is connectable to a first input of the rectification module, the anode of the second diode is connectable to a second input of the rectification module, the cathodes of the first and second diodes are both connected to the first plate of the capacitor, and the second plate of the capacitor is connectable to the negative output of the rectification module; and wherein:
  the capacitor is configured such that it is consistently charged to substantially a peak value of a supply voltage during normal operation; and
  the discharge device is connected to the first plate of the capacitor and is configured to discharge the capacitor when the voltage across the capacitor is in excess of the peak value of the maximum supply voltage and not substantially discharge the capacitor when the voltage across the capacitor is not in excess of the peak value of the supply voltage during normal operation.

There may be provided a surge protection circuit for a circuit comprising a rectification module, the surge protection circuit comprising:
  a first diode;
  a second diode;
  a capacitor; and
  a discharge device; wherein
the cathode of the first diode is connectable to a first input of the rectification module, the cathode of the second diode is connectable to a second input of the rectification module, the anodes of the first and second diodes are both connected to the first plate of the capacitor, and the second plate of the capacitor is connectable to the positive output of the rectification module; and wherein:
  the capacitor is configured such that it is consistently charged to substantially a peak value of a supply voltage during normal operation; and
  the discharge device is connected to the second plate of the capacitor and is configured to discharge the capacitor when the voltage across the capacitor is in excess of the peak value of the maximum supply voltage and not substantially discharge the capacitor when the voltage across the capacitor is not in excess of the peak value of the supply voltage during normal operation.

SUMMARY OF THE INVENTION

According to a further aspect of the invention, there is provided a surge protection circuit for a circuit comprising a rectification module, the surge protection circuit comprising:
  a first diode;
  a capacitor; and
  a discharge device; wherein a first terminal of the first diode is connectable to an output of the rectification module, a second terminal of the first diode is connected to the first plate of the capacitor, and the second plate of the capacitor is connectable to the other output of the rectification module; and wherein:

the capacitor is configured such that it is consistently charged to substantially a peak value of a supply voltage during normal operation; and the discharge device is connected to the capacitor and is configured to discharge the capacitor when the voltage across the capacitor is in excess of the peak value of the maximum supply voltage and not substantially discharge the capacitor when the voltage across the capacitor is not in excess of the peak value of the supply voltage during normal operation.

There may be provided a surge protection circuit for a circuit comprising a rectification module, the surge protection circuit comprising:

a first diode;
a capacitor; and
a discharge device; wherein the anode of the first diode is connectable to the positive output of the rectification module, the cathode of the first diode is connected to the first plate of the capacitor, and the second plate of the capacitor is connectable to the negative output of the rectification module; and wherein:

the capacitor is configured such that it is consistently charged to substantially a peak value of a supply voltage during normal operation; and the discharge device is connected to the first plate of the capacitor and is configured to discharge the capacitor when the voltage across the capacitor is in excess of the peak value of the maximum supply voltage and not substantially discharge the capacitor when the voltage across the capacitor is not in excess of the peak value of the supply voltage during normal operation.

There may be provided a surge protection circuit for a circuit comprising a rectification module, the surge protection circuit comprising:

a first diode;
a capacitor; and
a discharge device; wherein the cathode of the first diode is connectable to the negative output of the rectification module, the anode of the first diode is connected to the first plate of the capacitor, and the second plate of the capacitor is connectable to the positive output of the rectification module; and wherein:

the capacitor is configured such that it is consistently charged to substantially a peak value of a supply voltage during normal operation; and the discharge device is connected to the second plate of the capacitor and is configured to discharge the capacitor when the voltage across the capacitor is in excess of the peak value of the maximum supply voltage and not substantially discharge the capacitor when the voltage across the capacitor is not in excess of the peak value of the supply voltage during normal operation.

The discharge device may not substantially draw any current from a mains supply or the capacitor during normal operation. Although a small leakage current may be present that causes the capacitor to discharge by a very small amount during normal operation, this may not be considered as "significantly" discharging the capacitor to a value below the peak mains supply voltage.

In this way, the capacitor is only discharged following a surge event and not for every half cycle of the received mains supply as is the case with the prior art. Embodiments of the invention enable a low specification, low cost capacitor to be used as its charge is only substantially changed when a surge event occurs and not during "normal" operation, that is, when a surge event has not occurred. More specifically, the capacitor can only be charged in excess of the peak mains supply voltage when a surge event occurs, and may only be discharged back to the peak mains supply voltage, and not significantly below the peak mains supply voltage, when the surge event finishes. Normal operation may be considered as times at which surge events are not occurring and/or a mains dip is not occurring, and when the effects of a surge event and/or mains dip are not present in the circuit.

In this way, the lifetime of the capacitor can be extended compared with examples where a capacitor is charged and discharged for every half-cycle of a mains supply voltage.

Similarly, as the charge on the capacitor is not substantially changing during normal operation of the circuit, current may not substantially flow through the diodes during normal operation either. Therefore, low quality/specification diodes may also be deemed acceptable.

The capacitor may be configured such that its charge increases when a surge event occurs, and the increased charge may mainly discharge to the discharge device after the surge event. The increase in charge may be considered as the charge in excess of the steady-state charge supplied by the mains supply voltage during normal operation between surge events.

One or more embodiments described herein can enable a robust, economical surge protection circuit to be provided, and the surge protection circuit may be particularly suitable for circuits comprising a rectification module, a power factor correction (PFC) module and a switched mode power supply, for example. Switch-mode power supplies that do not have a direct current path to the output capacitor may particularly benefit from embodiments of the invention, as such power supplies may have to be protected from surges in a different way to that known from the prior art.

The circuit may further comprise a power factor correction (PFC) module, such as an isolated or a non-isolated PFC. The two outputs of the rectification module may be connected as inputs to the power factor correction module. The PFC may be a switched mode power supply (SMPS). The surge protection circuit may be configured to protect the PFC/SMPS from surge events/impulses in a mains supply.

The discharge device may be considered as comprising an activation component that automatically "activates" a dissipation component that dissipates energy only when a surge event occurs. Such an activation component may be a Zener diode or a transistor with a voltage divider or with comparator. A resistor is an example of a component that dissipates energy.

The discharge device may comprise a discharge resistor and a Zener diode. The Zener diode may be considered as an example of an "activation component", and the resistor may be considered as an example of an energy dissipating component that is provided with energy from a surge event when the activation component is activated.

The discharge resistor and Zener diode are examples of components that can form part of the discharge device. It will be appreciated that these components can be used such that they will not consume any energy, and therefore not unnecessarily discharge the capacitor, unless a surge event occurs. In this example, the discharge device may act as an open circuit during normal operation of the circuit as the breakthrough voltage of the Zener diode will not be exceeded.

In one embodiment the discharge resistor and Zener diode may be connected in series between the first plate of the capacitor and the second plate of the capacitor. A first pin of the discharge resistor may be connected to the first plate of the capacitor, a second pin of the discharge resistor may be connected to the cathode of the Zener diode, and the anode of the Zener diode may be connected to the second plate of the capacitor. In other examples, the relative positions of the discharge resistor and Zener diode can be reversed. In this way, the capacitor may discharge the charge of the surge event via the resistor when the breakthrough voltage of the Zener diode is exceeded.

In another embodiment the discharge resistor and Zener diode may be connected in series between the first plate of the capacitor and an output of the power factor correction module. A first pin of the discharge resistor may be connected to the first plate of the capacitor, a second pin of the discharge resistor may be connected to the cathode of the Zener diode, and the anode of the Zener diode may be connected indirectly to the second plate of the capacitor via an output of a non-isolated PFC module. In this way, the capacitor may discharge the charge of the surge event to the resistor and the output of the PFC module when the breakthrough voltage of the Zener diode is exceeded.

The Zener diode may have a breakthrough voltage that is higher than an expected peak voltage during normal operation. In embodiments where the Zener diode and the resistor are connected in series directly with the second plate of the capacitor, and so to the low output of the rectification module, the expected peak voltage during normal operation can represent the maximum operating voltage of the mains supply. In embodiments where the Zener diode and the resistor are connected to an output of the PFC module, and therefore indirectly to the second plate of the capacitor, the expected peak voltage during normal operation can represent the difference between the maximum operating voltage of the mains supply and the minimum output voltage of the PFC module (including a ripple voltage component where appropriate).

In this way, the Zener diode only conducts, and therefore allows the resistor to dissipate energy, when the charge on the capacitor is in excess of charge that represents the expected peak voltage across the component (which can depend upon how the capacitor is connected in the circuit) during normal operation.

The breakthrough voltage may be of the order of 5% or 10% higher than the expected peak voltage. For example, for a mains supply voltage with a peak value of 375 volts the breakthrough voltage may be greater than 380 volts. In some examples, a surge event may represent a voltage in the range of 0.5 kV to 4 kV depending upon its severity level.

In some examples, the capacitor is only discharged when the voltage across the capacitor exceeds the breakthrough voltage of the Zener diode. The capacitor will not discharge when the voltage does not exceed the breakthrough voltage of the Zener diode, as the Zener diode will not allow a current to flow through it; this is indicative of "normal" operation of the power supply.

It will also be appreciated that other components can be used as the discharge device that operate in the same way such that they can only act as a load when a surge event occurs. For example, a variety of active components such as bipolar transistors, MOSFET's, etc., having a conduction state that is changeable from on to off by means of a very high voltage divider in parallel to the capacitor can be used as an activation component. In this way, the discharge device is activated to discharge the capacitor when an expected peak voltage is exceeded and the threshold voltage of the transistor is satisfied so that the current channel of the transistor conducts. Such a transistor may be provided in series with a discharge resistor.

There may be provided a switched mode power supply comprising any surge protection circuit disclosed herein.

There may be provided an electronic device comprising any surge protection circuit disclosed herein.

According to a further aspect of the invention, there is provided a method of operating a surge protection circuit for a circuit comprising a rectification module, the surge protection circuit comprising:
 a first diode;
 a second diode;
 a capacitor; and
 a discharge device; wherein
a first terminal of the first diode is connected to a first input of the rectification module, a first terminal of the second diode is connected to a second input of the rectification module, a second terminal of the first and second diodes are connected to the first plate of the capacitor, and the second plate of the capacitor is connected to one of the outputs of the rectification module; and wherein:
 the discharge device is connected to the capacitor;
the method comprising:
 during normal operation:
  keeping the capacitor consistently charged to substantially a peak value of a supply voltage; and
 in case of a surge event:
  increasing the charge on the capacitor with current received as part of the surge event;
  discharging the current to the discharge device after the surge event.

The increase in charge on the capacitor may be considered as charge current in excess of that associated with the normal peak operating voltage of the mains supply.

According to a further aspect of the invention, there is provided a method of operating a surge protection circuit for a circuit comprising a rectification module, the surge protection circuit comprising:
 a first diode;
 a capacitor; and
 a discharge device; wherein
a first terminal of the first diode is connected to an output of the rectification module, a second terminal of the first diode is connected to the first plate of the capacitor, and the second plate of the capacitor is connected to the other output of the rectification module; and wherein:
 the discharge device is connected to the capacitor;
the method comprising:
 during normal operation:
  keeping the capacitor consistently charged to substantially a peak value of a supply voltage; and
 in case of a surge event:
  increasing the charge on the capacitor with current received as part of the surge event;
  discharging the current to the discharge device after the surge event.

BRIEF DESCRIPTION OF THE DRAWINGS

A description is now given, by way of example only, with reference to the accompanying drawings, in which.

DETAILED DESCRIPTION OF EMBODIMENTS

One or more embodiments described herein can provide a surge protection circuit that comprises a capacitor that is charged by a surge event, and a discharge device to discharge the capacitor following the surge event. The capacitor may be discharged after a surge event until the charge across the capacitor is substantially constant, for example at a level that corresponds to an expected peak value of the maximum (mains) supply voltage across the capacitor during normal operation. In this way, a low quality/specification capacitor can be used as the charge across the capacitor only significantly changes during and after a surge event. When a surge event is not occurring, the charge across the capacitor may be substantially constant. This can be in contrast to the prior art wherein any capacitor that is located at a similar position to the capacitor of the invention charges and discharges every half cycle of a mains input alternating current (AC) voltage. In such prior art examples, the capacitor needs to be of a minimum quality, which is higher than the minimum quality required by an embodiment of the invention, in order to be capable of transferring requisite amounts of energy to the output during normal operation. Furthermore, a capacitor of the prior art may completely or significantly discharge following a surge event and not be kept at a substantially constant value.

A capacitor that may be considered as suitable for embodiments of the present invention may be chosen to satisfy the requirements of the voltage associated with a surge event, and not necessarily for transferring power to the output. For example, the properties of a capacitor in terms of rms-current may not need to be accounted for according to embodiments of the invention.

Figure 1:
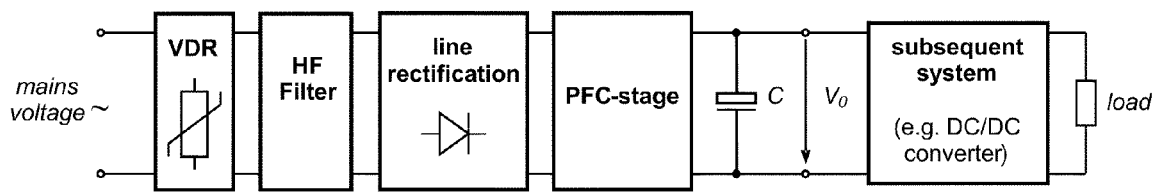
FIG. 1 illustrates a block diagram of a prior art power factor correction circuit (PFC)

For mains driven applications with high and medium power rates, switch-mode power supplies are often used in order to increase the efficiency of the application. Such switch-mode power supplies are also used to fulfil requirements concerning the necessity of nearly sinusoidal input currents to satisfy a standard, such as European standard EN61000-3-2. Thus an active power factor correction (PFC) circuit is often used as a primary stage followed by a bulk capacitor to smooth the output voltage and generate an output voltage that is as constant as possible (within economical justifiable limits) for subsequent dc-dc converters. FIG. 1 illustrates a block diagram of a mains driven power supply with power factor correction.

A problem with such an active PFC stage can be the immunity of the mains driven application to surge events. A surge event can be caused by a lightning strike, or can be a surge directly from the mains supplier, for example by the switching actions of external power systems or load.

In order not to be damaged irreparably, mains driven power converters should be protected against surge impulses. These surge impulses can cause failures in sensitive electronic devices as well as in more rugged power components such as the power switch of switch-mode power supplies. Therefore, such mains driven applications should be protected effectively against surge events. In some examples, a varistor can be used as a first protection element, but the varistor may not be sufficient to completely protect the power converter.

Figure 2:
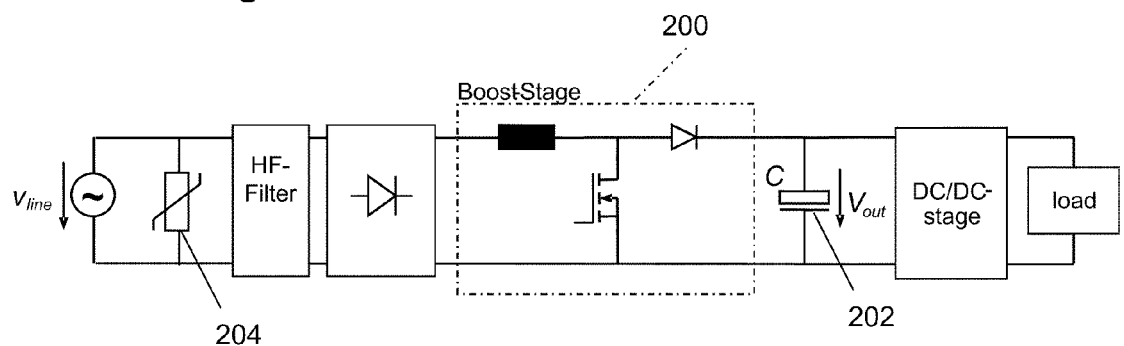
FIG. 2 illustrates a block diagram of a prior art active boost PFC stage.

In many cases the PFC-stage depicted in FIG. 1 is realized by a boost converter. FIG. 2 shows a circuit diagram of a typical boost converter 200.

The boost converter of FIG. 2 is an example of an SMPS where there is a direct, permanent, current path from the input to the capacitor 202. A varistor 204 along with the large bulk electrolytic capacitor 202 (for example of the order of greater than 100 µF in case of a 2 kV surge severity level) may be considered to adequately protect an SMPS. However, if a varistor with a medium sized bulk electrolytic capacitor (for example smaller than 100 µF, for example of the order of 68 µF) is used for power transfer purposes (or for any other reason), then adequate surge protection may not be provided.

In particular using a bulk output capacitor 202 for surge protection may not be sufficient to efficiently defend the switch-mode power supply from any damage, especially in low power applications where only small capacitance values are required for standard operation. It will be appreciated from the description that follows that embodiments of the invention can provide improved protection for boost converters.

A VDR 204 (voltage dependent resistor) is also provided in parallel across the input voltage supply to provide surge protection. The VDR may be a varistor. It will be appreciated that the HF-Filter of the circuit shown in FIG. 2 has chokes/inductors in series along the input current path. The HF-filter can provide some series impedance which limits (to some degree) the current to the output capacitor.

In examples where there is a no direct, permanent, current path from the input to a bulk capacitor, then a known varistor may not protect the SMPS effectively, as the varistor may not be sufficient to protect from surge voltages of up to 800V to 1500V. Therefore, additional protection devices/components may be needed.

Figure 3:
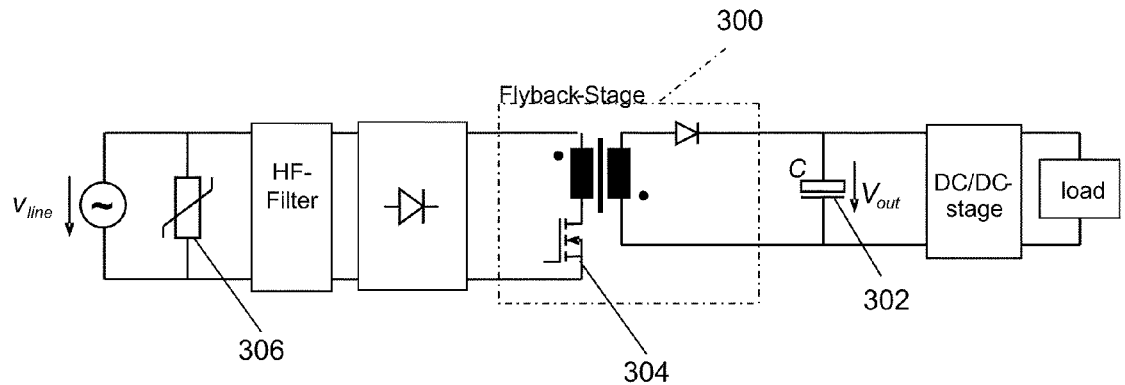
FIG. 3 illustrates a prior art isolated active flyback PFC stage.

In some prior art examples, a galvanic isolation is used within the mains driven power supply to improve the safety of the circuit. It can be possible to realize this galvanic isolation in the dc-dc stage or it may be provided in the primary PFC-stage. Realising this galvanic isolation in the primary PFC stage can be useful for low and medium power ranges where a flyback-converter can be used instead of a boost converter. FIG. 3 depicts a circuit diagram of a flyback converter 300.

In contrast to the boost PFC stage, an emerging surge impulse will find no path to charge the bulk output capacitor 302 and instead charges the parasitic capacitance at the primary side of the transformer responsible for galvanic isolation (for example, the parasitic capacitance of the main switch 304 of the PFC 300). Any small capacitance that is provided by an HF-filter capacitor may not be sufficient to suppress the surge in combination with the VDR 306. The PFC 300 can be destroyed as a consequence. Hence, the usage of a mains driven flyback-converter 300 often requires further protection devices.

The way in which surge protection is provided by the prior art can be different depending upon the configuration of the PFC stage that is being used.

Other PFC stages that do not provide a direct, permanent, current path from the line input to the bulk electrolytic output capacitor are known, and include non-isolated PFC-converters like PFC-Buck or PFC-Buck-Boost converters or Cuk, Sepic etc. PFC-topologies. In such examples, there is either no direct path available (flyback, forward, Cuk, Sepic converters) or the direct path is via a switch which could be open (Buck and Buck-Boost converters). As no current can flow into the output capacitor with these topologies, nearly all of the current will flow through the varistor, which implicates a high voltage level that is applied to the switch-mode power supply (SMPS). Such a high voltage can destroy components of the SMPS. Therefore, use of a single varistor for surge protection of such topologies may not be sufficient, and additional components like several varistors or a combination of a varistor and Transil-Diode are employed in the prior art. However, additional varistors or Transils can be very expensive.

One or more embodiments of the invention that provide an additional capacitor in parallel with the SMPS can provide a second path for a surge current, and can therefore reduce the likelihood of the SMPS being exposed to potentially damaging high voltages.

A feature of one or more embodiments of the invention presented here is to use only one additional bulk electrolytic capacitor and only one or more slow rectifying diodes for surge protection in order to take up a major part of the energy in case of a surge event. In addition, a discharge device can be used so that the additional bulk electrolytic capacitor is only charged and discharged when a surge event occurs and not during "normal" operation. The discharge device may be selected so that it can sufficiently discharge from a previous surge event before a next surge event occurs. The repetition rate and the severity level of the surge events may be defined by the IEC 61000-4.5 and IEEE C61.41.2 standard.

If a surge protection circuit according to an embodiment of the invention is not used, then the energy of a surge impulse coupled to one or both mains input voltage lines will be directly transferred to the PFC stage and will eventually destroy some of the components of the PFC stage. Inserting an additional bulk electrolytic capacitor along with the discharge device according to embodiments of the present invention can improve the situation.

Figure 4A:
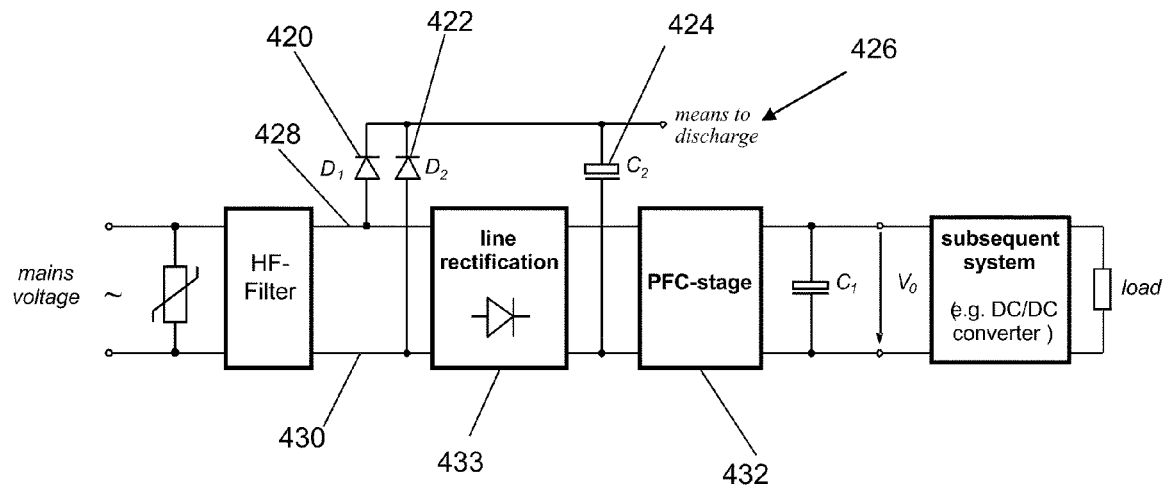
FIGS. 4a to 4d illustrate surge protection circuits according to embodiments of the invention.

FIG. 4a illustrates a surge protection circuit according to an embodiment of the invention. In comparison with the prior art, two diodes $D_1$ and $D_2$ 420, 422 as well as a capacitor $C_2$ 424 are provided. The anode of the first diode $D_1$ 420 is connected to a first mains power line 428, and the anode of the second diode $D_2$ 422 is connected to a second mains power line 430. It will be appreciated that a surge event of any polarity can be experienced on both the first and second mains power lines 428, 430 as mains power is AC. The diodes $D_1$ 420 and $D_2$ 422 together with capacitor 424 may provide sufficient surge protection for a surge impulse of any polarity in combination with any polarity of the mains.

The cathode of both the first diode $D_1$ 420 and second diode $D_2$ are connected to a first plate of the capacitor $C_2$ 424.

The second plate of the capacitor $C_2$ 424 is connected to one of the outputs of the rectification module 433, in this example, the low output of the rectification module 433.

Also, the first plate of the capacitor $C_2$ 424 is connected to a discharge device 426, examples of which are described below.

When a surge impulse is received at the mains power lines 428, 430, a major part of the energy will charge the additional capacitor $C_2$ 424 via one of the additional diodes $D_1$ and $D_2$ 420, 422. Prior to the occurrence of the surge impulse, the capacitor 424 is charged to the peak of the sinusoidal input voltage.

It will be appreciated that the voltage value across the additional capacitor $C_2$ 424 after a surge event depends on its capacitance value and it has been found that the usage of a bulk electrolytic capacitor as $C_2$ will keep the voltage level applied to the PFC stage 432 within an acceptable range of voltage values, thereby protecting the PFC stage 432.

In order to comply with any standards that may be in place, the device under test may have to withstand several successive surge impulses. Therefore, it may be ensured that the additional capacitor $C_2$ 424 can discharge to the original voltage level before the next surge impulse is expected in order to be able to effectively absorb the energy of the next surge impulse. The repetion rate of surge events and the severity level can vary for different applications, and therefore the capacitance of the additional capacitor $C_2$ can be selected accordingly.

Figure 4B:
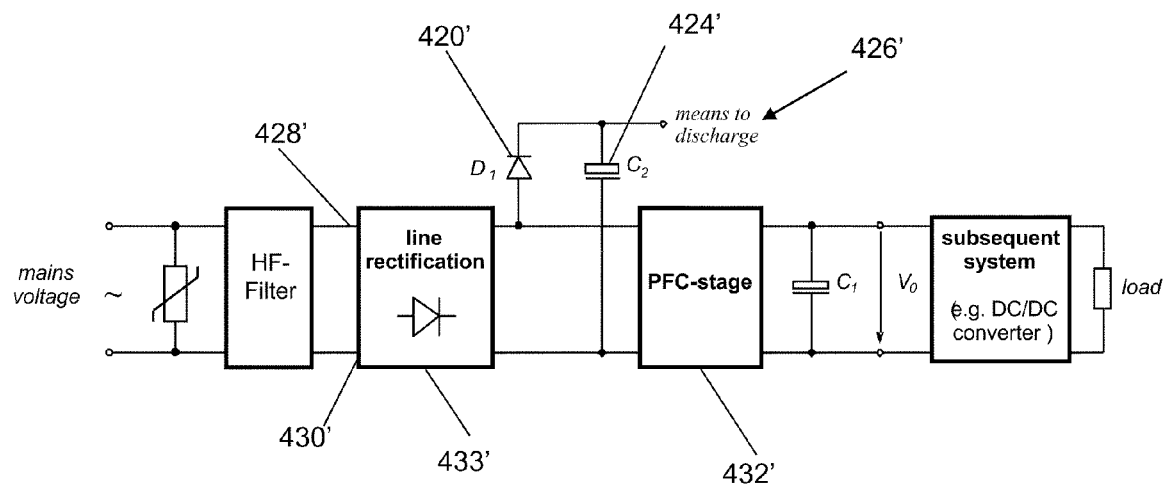

FIG. 4b illustrates a surge protection circuit that is similar to that of FIG. 4a. In FIG. 4b, only one diode $D_1$ 420' is present. The anode of the diode $D_1$ 420' is connected to the positive dc output of the rectification module 433', and the cathode of the diode $D_1$ 420' is connected to the first plate of the capacitor $C_2$ 424.

It will be appreciated that the surge protection circuit of FIG. 4b only requires a single diode because it is configured to process a surge event after rectification, and therefore the surge event will only be experienced by the DC output of the rectification module 433'. Nonetheless, the surge protection circuit of FIG. 4b can still serve to protect the PFC stage 432'.

Figure 4C:
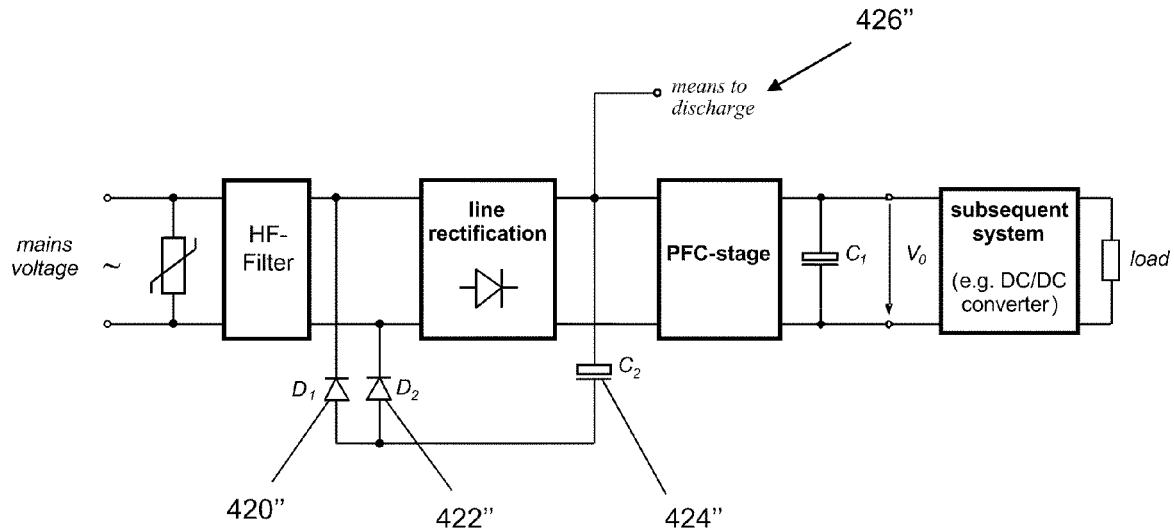

FIG. 4c illustrates a surge protection circuit according to an embodiment of the invention. In this example, the cathodes of the first and second diodes 420", 422" are connected to the two inputs to the rectification module, and the anodes of the first and second diodes 420", 422" are connected to the first plate of the capacitor 424". The second plate of the capacitor 424" is connected to the positive output of the rectification module. The discharge device 426" is connected to the second plate of the capacitor 424", which in this example is the positive plate of the capacitor during operation.

It will be appreciated that the embodiment of FIG. 4c is similar to that of FIG. 4a. The closed circuit that is provided to charge the capacitor 424" of FIG. 4c uses the additional diodes 420", 422" for providing a current path between the mains supply and the negative plate of the capacitor 424", and diodes of the rectification module for providing a current path between the mains supply and the positive plate of the capacitor 424".

In contrast, the closed circuit that is provided to charge the capacitor 424 of FIG. 4a uses the additional diodes 420, 422 for providing a current path between the mains supply and the positive plate of the capacitor 424, and diodes of the rectification module for providing a current path between the mains supply and the negative plate of the capacitor 424.

Figure 4D:
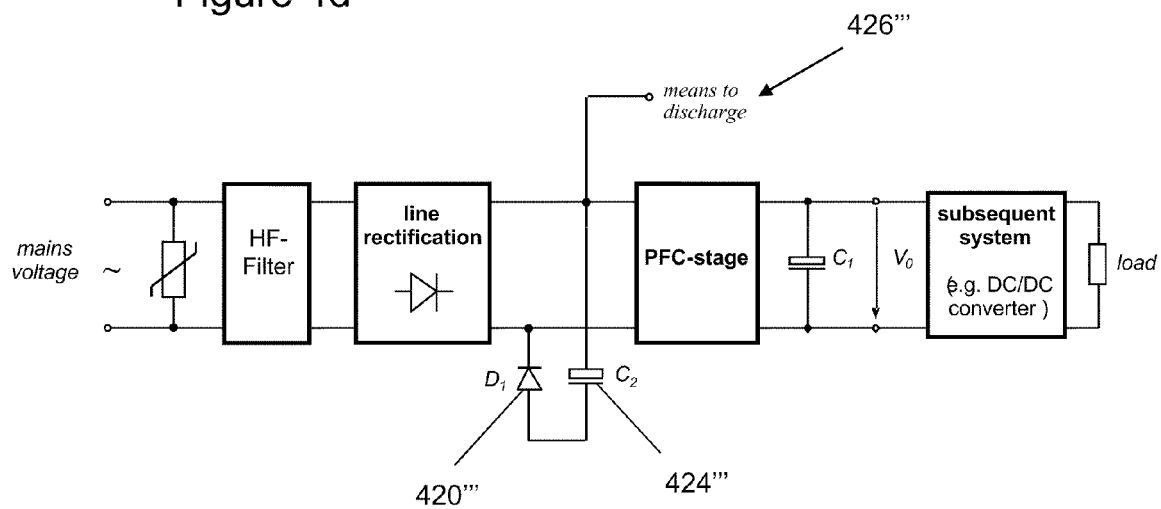

FIG. 4d illustrates a surge protection circuit according to an embodiment of the invention. In this example, the cathode of the first diode 420''' is connected to the negative output of the rectification module, and the anode of the first diodes 420' is connected to the first plate of the capacitor 424'''. The second plate of the capacitor 424''' is connected to the positive output of the rectification module. The discharge device 426" is connected to the second plate of the capacitor 424''', which in this example is the positive plate of the capacitor during operation.

It will be appreciated that the embodiment of FIG. 4d is similar to that of FIG. 4b. The closed circuit that is provided to charge the capacitor 424''' of FIG. 4d uses the additional diode 420' and a diode of the rectification module for providing a current path between the mains supply and the negative plate of the capacitor 424''', and a diode of the rectification module for providing a current path between the mains supply and the positive plate of the capacitor 424'''.

In contrast, the closed circuit that is provided to charge the capacitor 424' of FIG. 4b uses the additional diode 420' and a diode of the rectification module for providing a current path between the mains supply and the positive plate of the capacitor 424', and a diode of the rectification module for providing a current path between the mains supply and the negative plate of the capacitor 424'.

Examples of discharge device 426 according to embodiments of the invention will be described with reference to at least FIGS. 5 and 6. Although the embodiments that follow are based on a surge protection circuit with the structure of FIG. 4a, it will be appreciated that the embodiments are equally applicable to a surge protection circuit with the structure of any of FIG. 4b, 4c or 4d.

Figure 5:
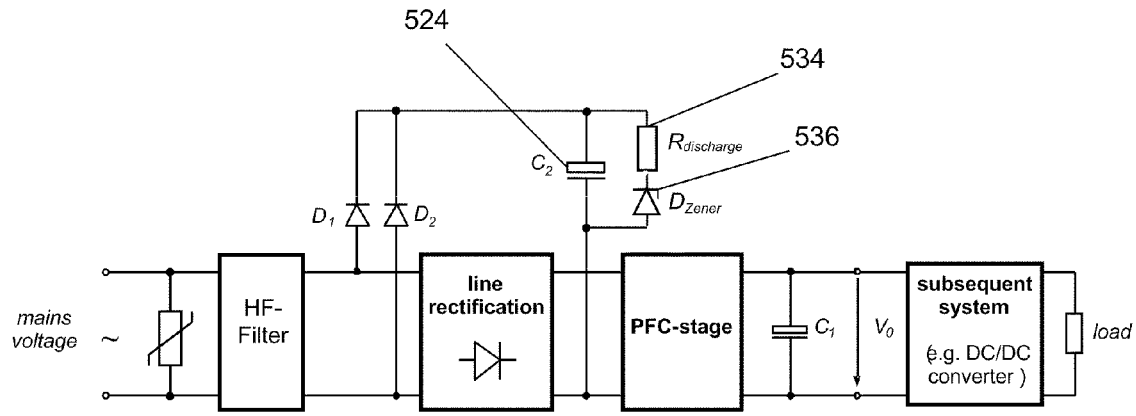
FIG. 5 illustrates a surge protection circuit according to another embodiment of the invention.

FIG. 5 illustrates an embodiment wherein the circuit depicted in FIG. 4a has been extended by a resistor $R_{discharge}$ 534 and a Zener diode $D_{Zener}$ 536 with a breakthrough voltage level just above the peak of the maximum operation voltage. In this example, a first pin of the resistor $R_{discharge}$ 534 is connected to the first plate of the capacitor 524. The second pin of the resistor 534 is connected to the cathode of the Zener diode $D_{Zener}$ 536. The anode of the Zener diode $D_{Zener}$ 536 is connected to the second plate of the capacitor 524.

The passive discharge device of FIG. 5 (comprising the resistor $R_{discharge}$ 534 and Zener diode $D_{Zener}$ 536) provides for discharge through the resistor $R_{discharge}$ 534 when a surge event occurs, that is, when the breakthrough voltage of the Zener diode $D_{Zener}$ 536 is exceeded. The Zener diode 536 may be considered as an activation component as it only activates the discharge device when its breakthrough voltage is exceeded. The resistor 534 may be considered as a current limiting component. In some examples, most of the dissipation can be performed by the Zener diode 536.

It will be appreciated that the locations of the discharge resistor $R_{discharge}$ 534 and Zener diode 536 may be exchanged, and that the discharge resistor $R_{discharge}$ 534 and Zener diode in series in any configuration can perform the required functionality of only discharging $C_2$ 524 when a surge event occurs. The Zener diode can consist of a series connection of two or several Zener diodes with lower breakdown voltage. For example, a 400V-Zener diode can be implemented by a series connection of two 200V Zener diodes or four 100V-Zener diodes.

According to another embodiment, the energy of the surge impulse can be transferred to the output of the PFC-stage. Such an embodiment is illustrated as FIG. 6. The difference between the circuits of FIGS. 5 and 6 is that the anode of the Zener diode $D_{Zener}$ 536 is connected to the high voltage output of the PFC stage 632 instead of the second plate of the capacitor 624. In this example, the discharge path to the second plate of the capacitor 624 is completed by the output capacitor (C) and through the PFC 632.

For the embodiment of FIG. 5, the capacitor 524 will discharge via $R_{discharge}$ 534 when the voltage of the additional capacitor $C_2$ 524 is higher than the breakthrough voltage of the Zener diode. The breakthrough voltage of the Zener diode may be higher than the peak voltage of the maximum operating voltage of the mains supply.

Figure 6:
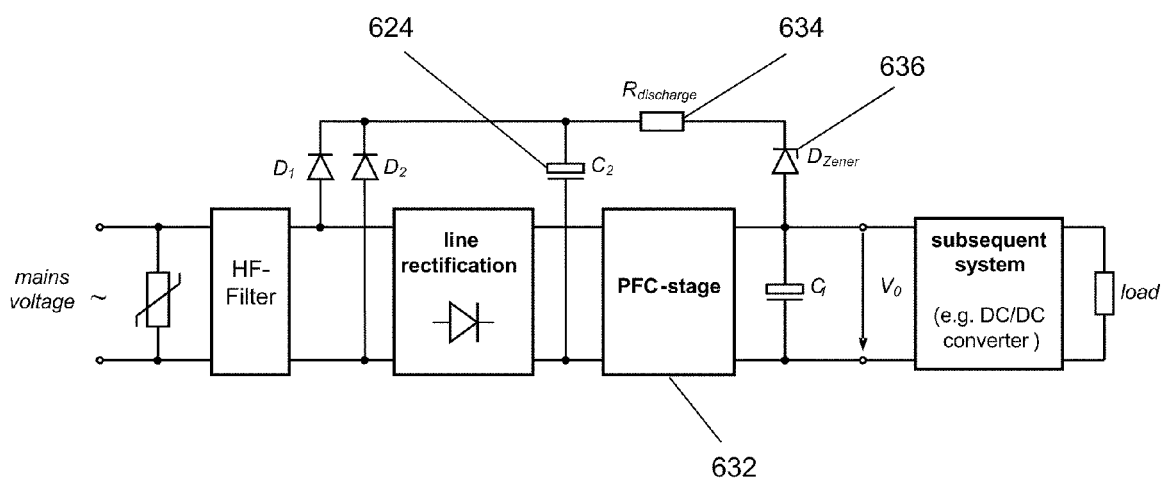
FIG. 6 illustrates a surge protection circuit according to another embodiment of the invention.

For the embodiment of FIG. 6, the capacitor 624 will discharge via $R_{discharge}$ 634 when the voltage of the additional capacitor $C_2$ 624 is higher than the sum of the output voltage and breakthrough voltage of the Zener diode. The breakthrough voltage of the Zener diode may be selected so that it is higher than the difference of the peak voltage of the maximum operating voltage of the mains supply and the minimum PFC output voltage, assuming that the output voltage is lower than the peak voltage of the mains supply.

The embodiment of FIG. 6 may be particularly suitable for non-isolated PFC stages as a discharge path via the PFC stage 632 is available, whereas the embodiment of FIG. 5 may be suitable for both isolated and non-isolated PFC stages.

With reference to FIG. 5, the discharge device is configured so that the capacitor 524 is not discharged when the voltage across the capacitor 524 is below the peak value of the supply voltage during normal operation, and an example will now be described with reference to a mains voltage supply in Europe. The input voltage range is 180 to 264V AC, rms. In order not to discharge at high mains, the Zener diode 536 voltage can be chosen equal or higher than sqrt(2)*264V=375V. This means, that if during operation at nominal voltage 230V a surge event occurs, the capacitor 524 voltage will rise to for example 450V. Thus, the Zener diode 536 will conduct so as to discharge the capacitor 524 via the resistor 534. This discharge will stop around 375V when the Zener diode 536 no longer conducts. However, afterwards the discharge will continue to sqrt(2)*230V=325V due to the unavoidable small leakage current of the capacitor 524 (this last discharge might even take minutes). Thus, under normal operation, the capacitor 524 will be charged to the peak of the momentary AC voltage (325V in our example of 230V AC, rms).

In examples where the discharge device is connected to the second plate of the capacitor such as that shown in FIG. 5, the breakthrough voltage of the Zener diode 536 should be greater than the peak of the maximum mains voltage, so greater than 375V.

In examples where the discharge device is connected to the output of the PFC module, such as that illustrated in FIG. 6, a Zener diode 636 having another breakthrough voltage should be used. Taking a non-isolated PFC-Buck converter as an example, it could have an output voltage of 100V+ripple. So let's assume the minimum output voltage is 75V. In case of the maximum input voltage of 265V, rms the capacitor 624 is again at 375V during normal operation. However, the discharge device is connected to the output of the PFC stage, thus to a minimum voltage level of 75V. Hence, the voltage applied on the discharge device is only 300V. In such an example, a Zener diode 636 with a breakthrough voltage of greater than 300V would be sufficient.

Embodiments of the invention can provide advantages for isolated PFC's, where there is no electrolytic capacitor in direct connection to the mains. The big electrolytic capacitor is at the secondary side of the mains isolating transformer for isolated PFC's and therefore may not be available for surge protection. The additional surge protection provided by embodiments of the invention can prevent damage to the PFC.

Embodiments of the invention can also be used with a non-isolated boost PFC that has very small output powers, whereby the electrolytic capacitor that is used to limit the 100 Hz-ripple is too small to absorb the surge energy.

For other non-isolated PFC's such as buck, buck-boost, Cuk, Sepic, the invention can show the same benefit as that discussed with reference to isolated PFC's, since these topologies do not have a direct connection between the supply voltage and the output capacitor.

Figure 7:
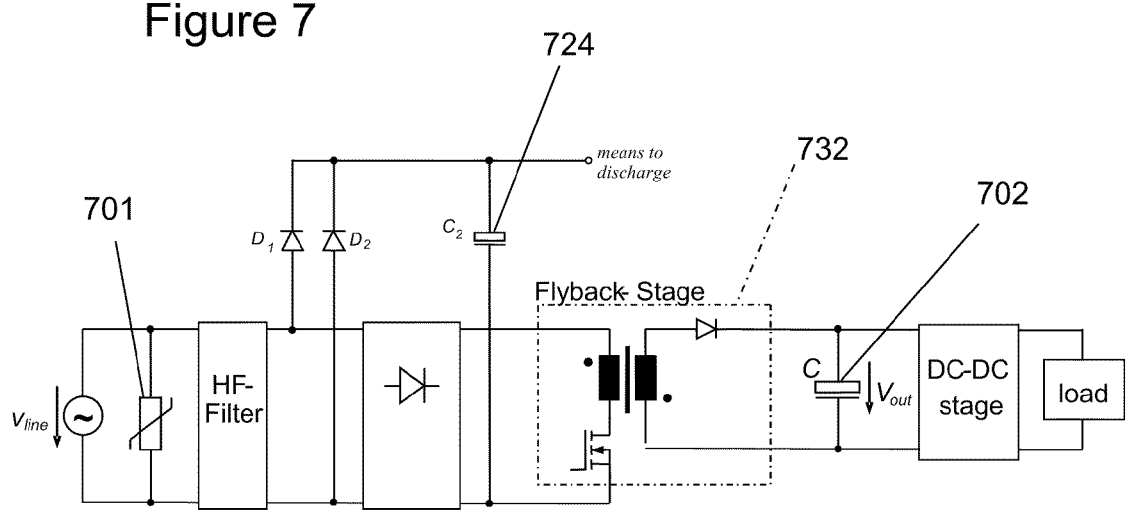
FIG. 7 illustrates a surge protection circuit according to another embodiment of the invention

Another embodiment of the invention is shown as FIG. 7. In this example, the PFC stage is a flyback-stage 732 that offers no direct path for a surge current to the output capacitor 702 across the outputs of the flyback-stage 732. In such an example, the varistor 701 across the input voltage supply may not be sufficient to provide surge protection, and the additional capacitor $C_2$ 724 of an embodiment of the invention may provide the additional surge protection that is required. It will appreciated that the additional capacitor 724 can also be used for other isolated PFC stages such as forward, half-bridge, full-bridge or resonant converters and for other non-isolated PFC stages with no direct current path from the input to the bulk capacitor such as Buck, Buck-Boost, Sepic, Cuk etc.

Figure 8:
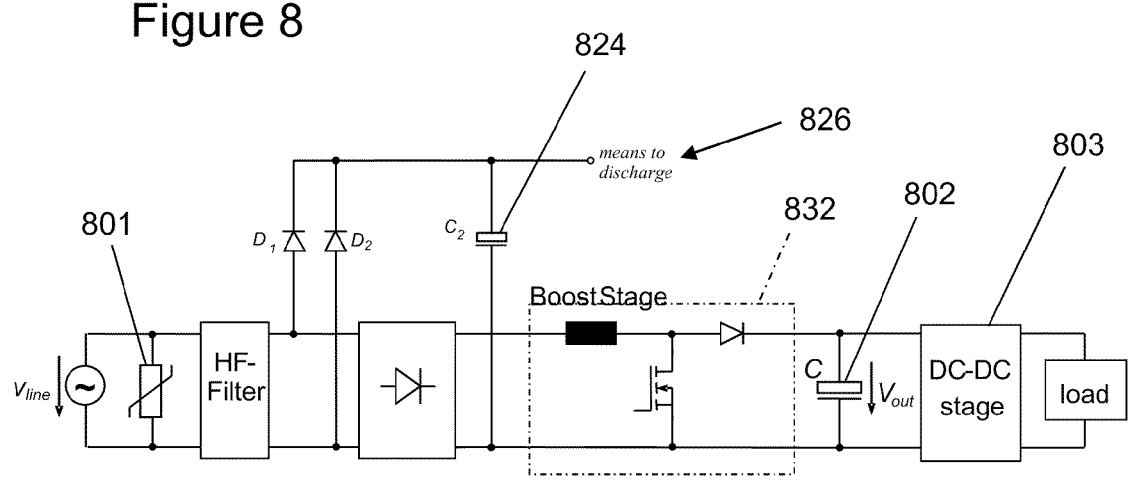
FIG. 8 illustrates a surge protection circuit according to another embodiment of the invention.

A further embodiment of the invention is shown as FIG. 8. In this example, the PFC stage is a Boost-stage 832 that provides a direct path for a surge current to the output capacitor 802. In such an example, a further surge protection means in addition to the known varistor 801 and output capacitor 802 may be necessary.

The further surge protection means may be required as the value of the output capacitor C 802 is normally selected so as to transfer power, and is not selected to absorb the very seldom occurring surge impulses. Therefore, and especially in case of an SMPS with small power ratings, the value of the output capacitor C 802 may be too small to adequately provide surge protection. That is, even the combination of the varistor 801 and the output capacitor 802 may not be able to protect the power supply efficiently. Therefore, an additional capacitor $C_2$ 824 of an embodiment of the invention may be required to provide adequate surge protection.

In prior art examples, the value of the output capacitor C 802 can be selected in order to provide a "hold-up" time for the output signal. This may be in addition to a consideration of the power that is to be transferred to the output when selecting the value of the output capacitor 802. The energy stored in the output capacitor C 802 can then be used to maintain the operation of the subsequent dc-dc stage 803 for short periods of time during which the mains voltage breaks down (mains dips), and a specified period of time that the output capacitor C 802 can contribute to the output is known as the hold-up time. As a consequence, the output capacitor C 802 can have a minimum capacitance proportional to the stored energy so that a required hold-up time can be guaranteed. Often, the required hold-up time, and not the power transfer requirement, is used to determine the size of the high quality output capacitor C 802.

The additional capacitor $C_2$ 824 according to the embodiment of FIG. 8, in combination with the discharge device 826 can also be used to contribute to a required hold-up time: The additional capacitor $C_2$ 824 is charged to the peak of the line voltage in standard/normal operation (that is, periods of time when there is no surge and no mains-dips). The energy stored in the additional capacitor $C_2$ 824 can now be transferred in case of a mains dip to the input or output of the PFC-stage, so that the energy can help to maintain the operation of power supply unit.

An advantage provided by the embodiment of FIG. 8 is that the original output capacitor C 802 can be made smaller since it has to be dimensioned only for the power rating and not the "hold-up time", as the additional capacitor $C_2$ 824 can contribute to the hold-up time as well as providing surge protection. The hold-up time requirement is now addressed primarily by $C_2$ 824. It will be appreciated that in such embodiments, the additional capacitor $C_2$ 824 is not discharging permanently in normal operation, but in the case of a seldom occurring mains dip event. However, in this case it is naturally discharged below the peak of the line voltage.

Different discharge devices for discharging the capacitor are possible according to embodiments of the invention. A suitable discharge device may be selected based on the expected severity level and repetition rate of the surge impulses. The severity of a surge impulse may be determined by the maximum occurring voltage of the surge impulse, and four severity levels from 0.5 kV to 4 kV are known. Examples of suitable discharge devices are provided below.

In practice, in some cases the leakage of a very large capacitor can be used as the discharge device. Such a capacitor can absorb several surge impulses, and have a leakage current that is "large" enough to sufficiently discharge the capacitor before a new series of surge impulses starts.

Figure 9:
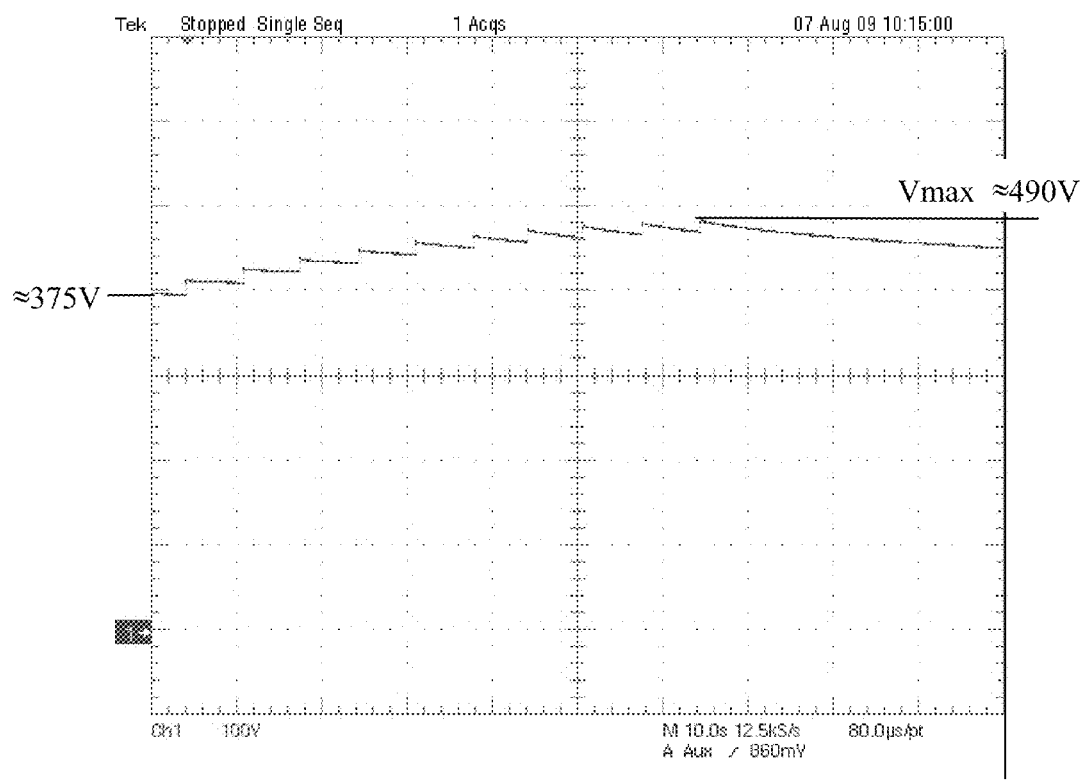
FIG. 9 illustrates graphically use of a surge protection circuit according to an embodiment of the invention.

FIG. 9 illustrates graphically the results of testing an embodiment of the invention wherein the leakage current of a single capacitor provides the functionality of the discharge device. The horizontal axis in the graph of FIG. 9 represents time, and the vertical axis represents voltage across the capacitor as the discharge device. This example may be considered as suitable for protecting against surges with lower severity levels.

FIG. 9 shows the application of ten pulses with a severity level of 0.5 kV, and a repetition rate of 6 seconds (according to the standard, a repetition rate of only 60 seconds is required). The testing reveals that the voltage across the capacitor remains within acceptable limits (Vmax=490V) by selecting an appropriate value for the capacitor. This is because the capacitor discharges a little bit due to the leakage current within 6 seconds between surge events. FIG. 9 shows that the capacitor will not discharge below the peak of the mains voltage, as the mains would charge it up to the peak value every 10 ms) as shown in FIG. 9.

An alternative discharge device includes a resistor in parallel with a capacitor. The additional resistor may be required if the leakage current is not sufficient to adequately discharge the capacitor before the occurrence of the next surge event. In such examples, the resistor may have a high resistance value and can be used to ensure that the capacitor is discharged to the peak of the main voltage before a next surge impulse. This discharge device may lead to some additional losses as the capacitor will always be discharged a little bit, even in standard operation.

Such a discharge device is know in the art in relation to stacked capacitors in order to symmetrise the voltage across the stacked capacitor, as the leakage current can vary from part to part, as well as due to temperature. A benefit of a huge parallel resistor can be the possibility to design with a known well defined leakage current. Nevertheless, the amount of leakage current (which may be approximately five times the worst case leakage) is still so small, that it should not be considered as significant discharge of the capacitor within one mains cycle. Thus, also with such a resistor, the capacitor would still be charged to substantially a maximum value of the mains supply voltage during normal operation. An advantage to using the resistor in parallel with the capacitor is that a greater range of severity levels of a surge event can be dealt with.

It will be appreciated that the above examples of discharge devices are not limiting, and that any discharge device that can perform the functionality of only substantially charging and discharging a capacitor during and after a surge event, whilst not discharging the capacitor during "normal" operation", can be provided. Examples of suitable discharge devices can also include active discharge devices, for example, through use of an extra SMPS to transfer the energy stored in the capacitor to the output.

Examples of active discharge devices that can be used with embodiments of the invention can include bipolar transistors, MOSFETs etc., wherein the conduction state of the component is changed from off to on by means of very high voltage divider in parallel to the capacitance. In this way, the active discharge component can turn on and provide the necessary discharge path when the voltage is in excess of the peak voltage of the maximum mains. In this way, it can also be envisioned that hysteresis can be added to the discharge device, such that discharge is kept active to reach more quickly a lower capacitor voltage than without hysteresis. This can be especially beneficial for repetitive surge impulses.

A person skilled in the art will appreciate that there are numerous ways to provide this functionality, for example by using a voltage divider to bring the gate of a MOSFET above threshold when a surge event occurs, or by using a voltage divider which feeds a comparator whose output turns-on the active component when a surge event occurs.

In some examples, a power supply can be used as the discharge device such that it is activated after a surge event or in case of mains dips, and is otherwise deactivated during normal operation. In such embodiments, the capacitor will still be charged to substantially a maximum value of the mains supply voltage during normal operation.

Figure 10:
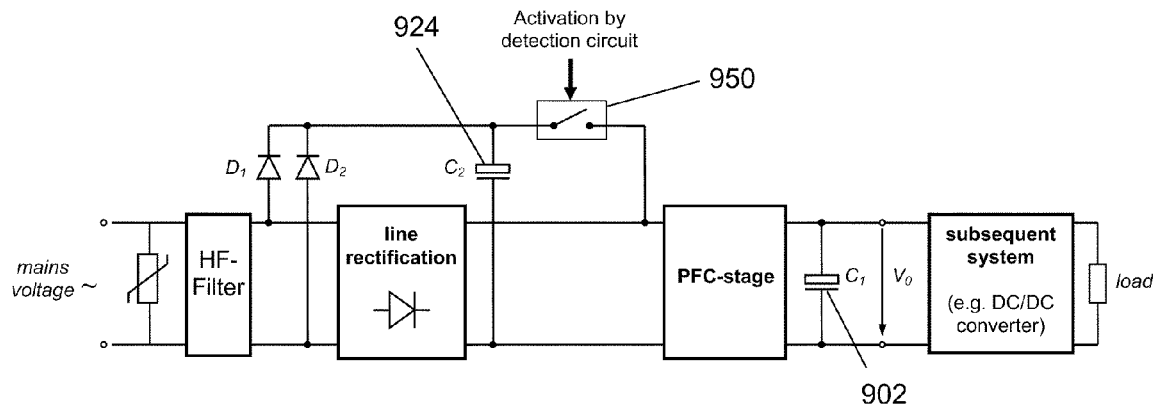
FIG. 10 illustrates a surge protection circuit according to another embodiment of the invention.

As indicated above in relation to FIG. 8, a hold-up time requirement can be addressed by a capacitor according to an embodiment of the invention. The capacitor can be used to provide an output voltage during "mains dips". FIG. 10 illustrates a diagram of such an embodiment. In this embodiment the output capacitor $C_1$ 902 may not have to be dimensioned to provide hold-functionality, and can be dimensioned in accordance with the desired power rating.

The circuit of FIG. 10 can transfer the energy stored by capacitor $C_2$ 924 to the input of the PFC-stage by operating an active switch 950, which may by bipolar transistor, a MOSFET, a IGBT etc. when a mains dip is detected.

Figure 11:
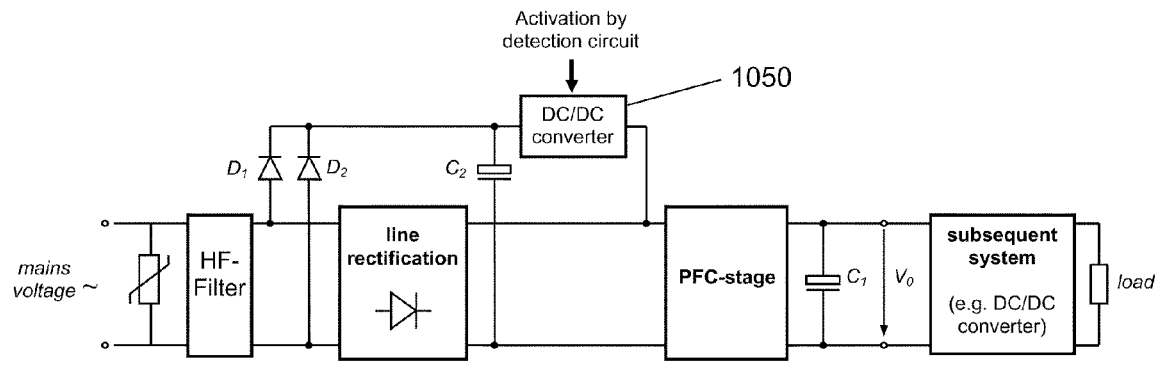
FIG. 11 illustrates a surge protection circuit according to another embodiment of the invention.

FIG. 11 shows a circuit according to a further embodiment of the invention, where the switch 950 of FIG. 10 is replaced by a DC-DC converter 1050, which is only activated upon the detection of a seldom occurring mains-dip event.

One or more of the surge protection circuits described herein can be fitted to any electronic device that is susceptible to surge events/impulses, especially mains driven devices/applications. Examples of such electronic devices include television sets, personal computers, DVD players, satellite/cable decoder boxes, stereo systems, and any other electronic entertainment device, as well as non-entertainment electronic devices. A possible application is a power supply for LCD-televisions, monitors etc., for example an LCD-TV with LED backlights where a mains-isolated PFC-stage can be required. A mains-isolated PFC-flyback-stage can benefit from surge protection provided by embodiments of the invention. Lighting ballasts and external power-supplies (such as adapters) can also be used with embodiments of the invention. However, it will be appreciated that embodiments of the invention are not limited to any specific type of electronic device.

In some embodiments only a single capacitor and only two diodes may be used to provide surge protection, optionally in combination with a varistor and this can offer a reduction in cost over the prior art. Furthermore, it may be possible to use lower quality/specification components as they are only operated when a surge event occurs and not during normal operation. For example an inexpensive bulk capacitor can be used to provide adequate surge protection.

One or more embodiments of the invention can enable standards such as EN61000-3-2 to be satisfied economically and efficiently. In some examples, the surge protection circuit does not influence the input current waveform so that EN61000-3-2 is still fulfilled, and additionally any standards concerning surge protection can also be addressed.

The invention claimed is:

1. A surge protection circuit for a circuit having a rectification module, the surge protection circuit comprising:
    a first diode;
    a second diode;
    a capacitor; and
    a discharge device, wherein a first terminal of the first diode is connectable to a first input of the rectification module, a first terminal of the second diode is connectable to a second input of the rectification module, second terminals of the first and second diodes are both connected to a first plate of the capacitor and the discharge device, and a second plate of the capacitor is connectable to one of the outputs of the rectification module, the capacitor is configured such that it is consistently charged to substantially a peak value of a maximum supply voltage during normal operation between surge events, the discharge device is connected to the capacitor and is configured to discharge the capacitor when a voltage across the capacitor is in excess of the peak value of the maximum supply voltage and not substantially discharge the capacitor when the voltage across the capacitor is not in excess of the peak value of the maximum supply voltage.

2. The surge protection circuit of claim 1, wherein the capacitor is configured such that its charge increases when a surge event occurs, and the increased charge discharges to the discharge device after the surge event.

3. The surge protection circuit of claim 1, wherein the capacitor is configured such that it is only substantially discharged after a surge event.

4. The surge protection circuit of claim 1, wherein the discharge device comprises:
    a discharge resistor; and
    a Zener diode, wherein the discharge resistor and the Zener diode are connected in series between the first plate of the capacitor and the second plate of the capacitor.

5. The surge protection circuit of claim 4, wherein the Zener diode has a breakthrough voltage that is higher than a peak voltage of a maximum voltage of a voltage supply.

6. The surge protection circuit of claim 1, further comprising:
    a power factor correction module, wherein the two outputs of the rectification module are connected as inputs to the power factor correction module.

7. The surge protection circuit of claim 6, wherein the discharge device comprises:
    a discharge resistor; and
    a Zener diode, wherein the discharge resistor and the Zener diode are connected in series between the first plate of the capacitor and an output of the power factor correction module.

8. The surge protection circuit of claim 7, wherein the Zener diode has a breakthrough voltage that is higher than a difference between a peak voltage of a maximum voltage of a voltage supply and a minimum voltage of the output of the power factor correction module.

9. The surge protection circuit of claim 1, wherein the capacitor is configured such that it is discharged upon occurrence of a mains dip event.

* * * * *